United States Patent [19]
Ishikawa et al.

[11] 4,016,533
[45] Apr. 5, 1977

[54] DEVICE FOR WARNING OF EXCESSIVE WEAR ON A BRAKE LINING

[75] Inventors: Masakazu Ishikawa; Sadayoshi Ito; Hiroyuki Oka, all of Toyota; Kennoske Iida, Iwatsuki; Kenji Usui, Susono; Masayoshi Asaba, Gotenba, all of Japan

[73] Assignee: Toyota Jidosha Kogyo Kabushiki Kaisha, Tokyo, Japan

[22] Filed: Oct. 21, 1974

[21] Appl. No.: 516,577

[30] Foreign Application Priority Data

Apr. 26, 1974 Japan .................. 49-47841[U]

[52] U.S. Cl. .................. 340/52 A; 200/61.4; 188/1 A
[51] Int. Cl.² .................. B60R 25/10; F16D 66/02
[58] Field of Search .................. 340/52 A; 200/61.4, 200/61.41, 61.44; 188/1 A

[56] References Cited
UNITED STATES PATENTS 3,223,795 12/1965 Yerman .................. 200/61.4
3,321,045 5/1967 Veilleux .................. 188/1
3,365,934 1/1968 Holz et al. .................. 73/70
3,674,114 7/1972 Howard .................. 188/1 A
3,783,979 1/1974 Hess .................. 188/1 A
3,882,448 5/1975 Shibatani et al. .................. 340/52 A Primary Examiner—John W. Caldwell
Assistant Examiner—Joseph E. Nowicki
Attorney, Agent, or Firm—Kenyon & Kenyon

[57] ABSTRACT

A device for warning of the occurrence of excessive wear on the brake lining of a brake for a vehicle, in which a detecting element for detecting an increase in the amount of wear on the lining from a predetermined value is mounted on a rear plate supporting the lining, a part of the detecting element projects from the rear plate to the outside of the brake, and a metallic cylindrical cover is fixed to the rear plate so as to cover said projecting part of the detecting element, thereby preventing foreign material from contacting the detecting element when the vehicle is in operation.

3 Claims, 14 Drawing Figures

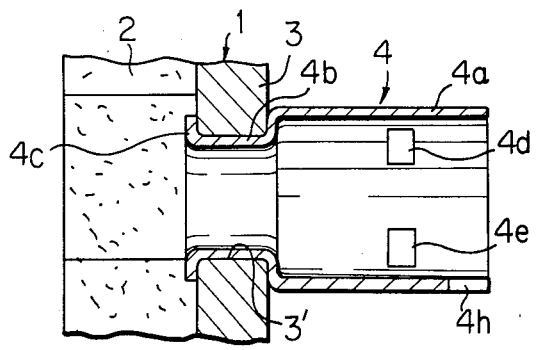
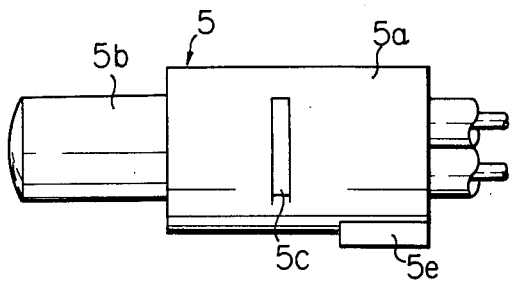
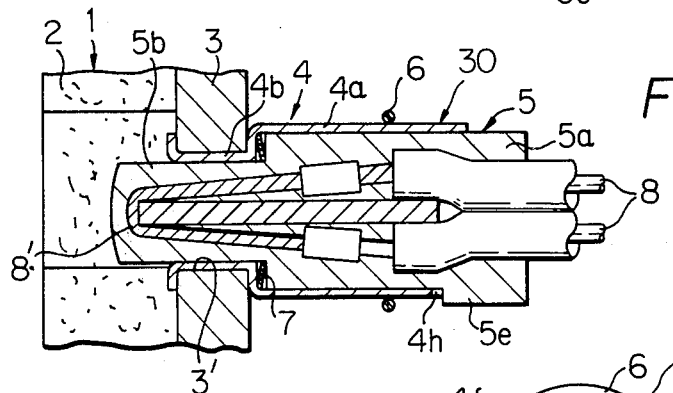
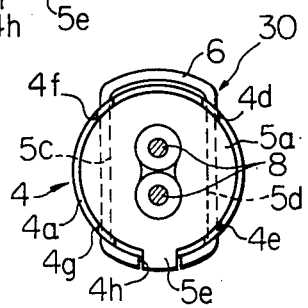

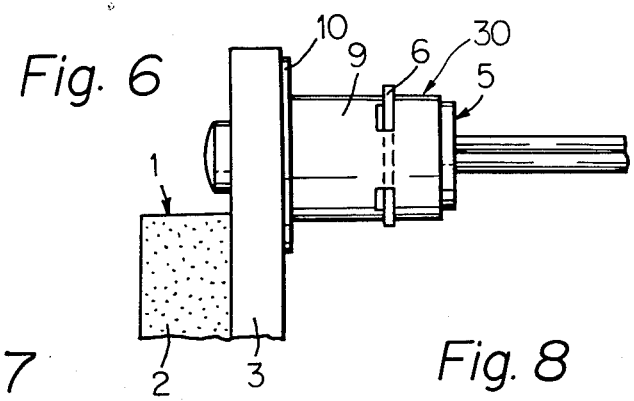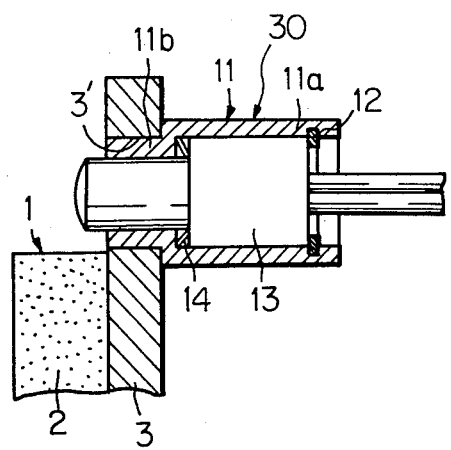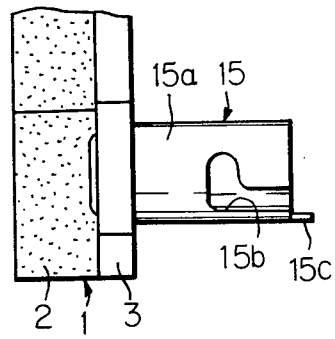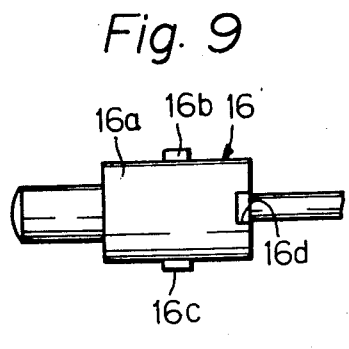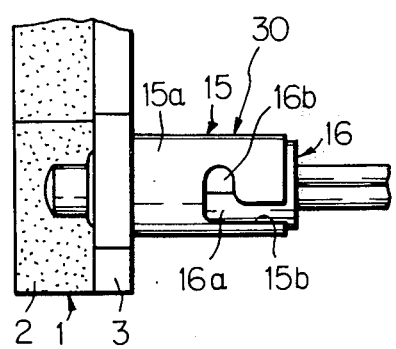

DEVICE FOR WARNING OF EXCESSIVE WEAR ON A BRAKE LINING

DESCRIPTION OF THE INVENTION

The present invention relates to a device for warning of the occurrence of excessive wear on a brake lining and particularly relates to a device for detecting an increase in the amount of wear on the brake lining of a disk brake from a predetermined value and providing a warning signal to an operator of the vehicle indicating the excessive wear of the lining.

In a conventional device for warning of the occurrence of excessive wear on a brake lining, the warning device comprises a detecting element for detecting an increase in the amount of wear on the lining from a predetermined value and a warning circuit electrically connected to the detecting element for providing a warning signal for an operator. The body of the detecting element is made of synthetic resin and is directly fixed to the rear plate supporting the brake lining. However, a part of the body of the detecting element projects from the rear plate and is exposed to the outside of the disk brake that is to say, exposed underneath the vehicle body. Therefore, because the detecting element has a relatively small impact resistance, if pebbles and other object thrown up by the wheel of the vehicle were to strike said projecting part of the body of the detecting element, the element would be destroyed.

An object of the present invention is to eliminate the above-mentioned disadvantage.

According to the present invention, a device for warning of the occurrence of excessive wear on the brake lining of a brake for a vehicle, which has a warning circuit for providing a warning signal to an operator of the vehicle indicating the excessive wear of the lining, comprises a rear plate supporting the brake lining, a detecting element for detecting an increase in the amount of the wear on the lining from a predetermined value and allowing the warning circuit to generate the warning signal, said detecting element having one part which projects from the surface of said rear plate on which surface the brake lining is mounted and another part thereof projecting from the opposite surface of said rear plate, and a metallic means for covering said other part of the detecting element, thereby preventing foreign material from contacting the detecting element when the vehicle is in operation, the end of the metallic means being fixed to the rear plate. The aforementioned object and other objects of the invention may be more fully understood from the following description of a preferred embodiment of the invention, together with the accompanying drawings.

BRIEF DESCRIPTIONS OF THE DRAWINGS

In the drawings:

FIG. 2 is a cross sectional view of the hollow cylindrical cover in the embodiment shown in FIG. 1;

FIG. 3 is a side view of the detecting element in the embodiment shown in FIG. 1;

FIG. 4 is a cross sectional view showing the detecting element shown in FIG. 3 assembled to the cylindrical cover shown in FIG. 2;

FIG. 5 is a rear view of the assembly in FIG. 4 looking from the right in FIG. 4;

FIG. 6 is a side view of the second embodiment of the invention;

FIG. 7 is a side view, partly in cross section, of the third embodiment of the invention;

FIG. 8 is a side view of the hollow cylindrical cover in the fourth embodiment of the invention;

FIG. 9 is a side view of the detecting element in the fourth embodiment of the invention;

FIG. 10 is a side view showing the detecting element shown in FIG. 9 assembled to the cylindrical cover shown in FIG. 8;

DESCRIPTION OF PREFERRED EMBODIMENT

Figure 1:
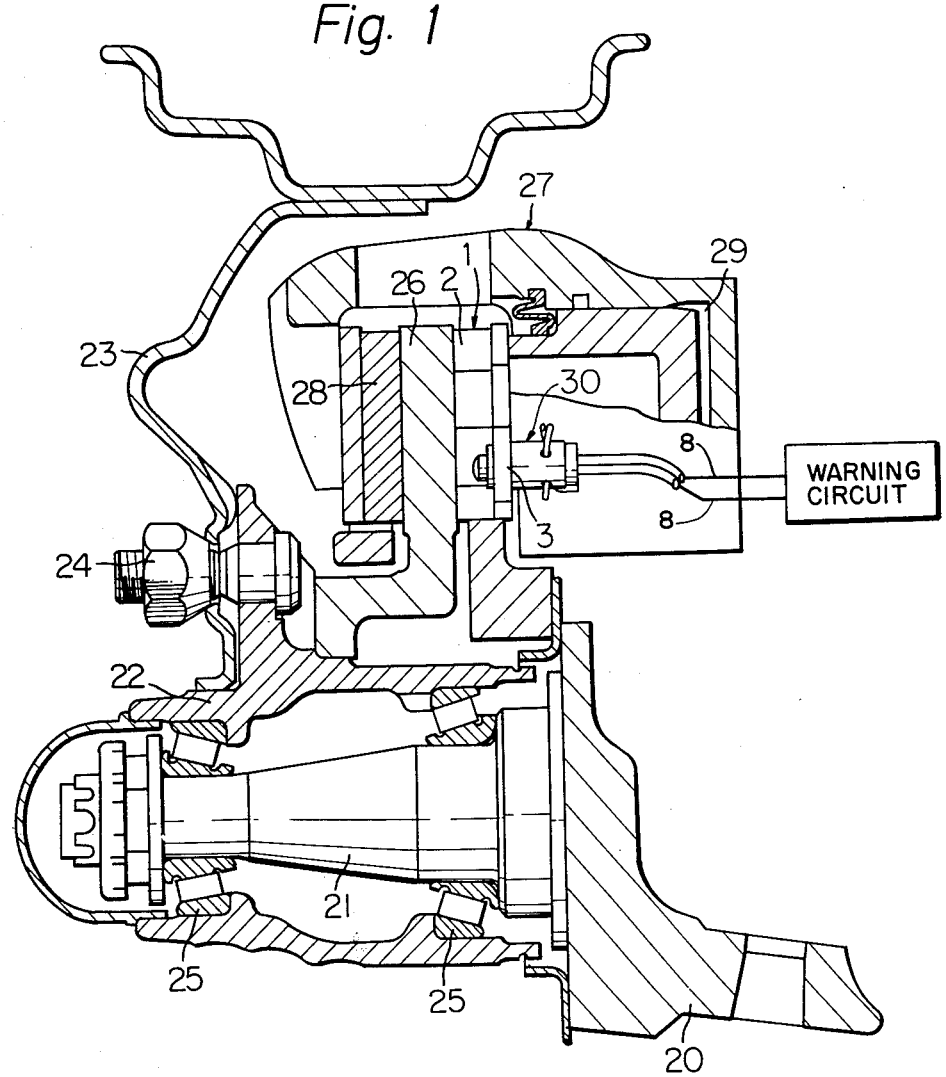
FIG. 1 is a front elevational view, partly in cross section, of a disk brake provided with a warning device according to the invention.

Referring to FIG. 1, a wheel 23 of a vehicle is fixed to a hub 22 by means of bolts 24 and the hub 22 is mounted on a shaft 21 via bearings 25 so as to rotate freely about the shaft 21. The shaft 21 is rigidly fixed to a knuckle 20. A disk 26 is rigidly fixed to the hub 22 so as to rotate together with it. Above the shaft 21 there is a caliper, designated as a whole by reference number 27, which is fixed to the knuckle 20. The caliper 27 is provided with a rubbing pad 1 and a pad 28 on each of the two sides of the disk 26. Thus, when pressure is applied to a cylinder 29, the disk 26 is held strongly and tightly between the rubbing pad 1 and the pad 28, thereby braking the vehicle. The rubbing pad 1 comprises a lining 2 and a rear plate 3 supporting the lining 2. A detecting device 30 for warning of the occurrence of excessive wear in the brake lining 2 is attached to the rear plate 3.

Referring to FIG. 2, which shows an enlarged cross sectional view of the first embodiment of the present invention, a metallic hollow cylindrical cover 4 comprises an increased diameter portion 4a and a reduced diameter portion 4b. The reduced diameter portion 4b of the cylindrical cover 4 is fitted into a hole 3' formed on the rear plate 3 and then the end of the reduced diameter portion 4b is bent outwardly and flattened so as to be secured on the edge of the hole 3' as indicated by 4c. Thus the cylindrical cover 4 is rigidly fixed to the rear plate 3. The increased diameter portion 4a of the cylindrical cover 4 is provided with two pairs of openings 4d, 4e and 4f, 4g into which a pin 6 is inserted as shown in FIG. 5. The bottom end of the increased diameter portion 4a is provided with a slot 4h.

Referring to FIG. 3, which shows a detecting element 5, the detecting element 5 is made of a synthetic resin such as an epoxy resin and comprises an increased diameter portion 5a and a reduced diameter portion 5b. Circumferentially extending grooves 5c and 5d (shown in FIG. 5) are formed opposite each other on the cylindrical surface of the increased diameter portion 5a and a projection 5e is formed on the bottom end of the increased diameter portion 5a.

Referring to FIG. 5 and to FIG. 4, which shows the detecting device 30 after assembling the detecting element 5 to the rear plate 3, the increased diameter portion 5a and the reduced diameter portion 5b of the detecting element 5 are inserted into the increased diameter portion 4a and reduced diameter portion 4b of the cylindrical cover 4, respectively, in such a manner that the projection 5e of the detecting element 5 is fitted into the slot 4h of the cylindrical cover 4, thereby preventing the relative rotation of the detecting element 5 with respect to the cylindrical cover 4. After this insertion, the pairs of openings 4d, 4e and 4f, 4g are aligned with the grooves 5d and 5c respectively. Thus the U-shaped pin 6 is inserted through the openings 4d, 4e, 4f, 4g and engaged with the grooves 5d, 5c. The ends of the pin 6 are then bent inwardly. Thus, the insertion of the pin 6 prevents the release of the detecting element 5 from the cylindrical cover 4. A diaphragm spring 7 is fitted between two shoulders, one of which being formed between the increased diameter portion 4a and the reduced diameter portion 4b of the cylindrical cover 4, and the other being formed between the increased diameter portion 5a and the reduced diameter portion 5b of the detecting element 5, thereby preventing looseness of the detecting element 5 in the cylindrical cover 4. As seen from FIG. 4, the increased diameter portion 4a of the cylindrical cover 4 serves both as a cover for the increased diameter portion 5a of the detecting element 5 and to hold the detecting element 5, and the reduced diameter portion 4b of the cylindrical cover 4 serves to connect the cylindrical cover 4 to the rear plate 3.

When long service of the disk brake causes the lining 2 to be worn away to the point that it should be replaced, a loop 8' of a wire 8 which is secured in the mould of the detecting element 5 is worn to the point that it is no longer continuous, thus causing disconnection of the wire 8. The wire 8 is electrically connected to a conventional warning circuit which detects the non-continuity of the wire 8 and provides a warning signal to an operator of the vehicle indicating the excessive wear of the lining 2.

As mentioned previously with reference to FIG. 4, the part of the detecting element 5 projecting from the side of the rear plate 3 opposite the side thereof on which the lining 2 is mounted is covered by the cylindrical cover 4 fixed to the rear plate 3. This arrangement of the cover 4 prevents destruction of the detecting element 5 by pebbles and other objects thrown up by the wheel of the vehicle.

Referring to FIG. 6, which shows the second embodiment of the present invention, a flange 10 is formed on the end of a hollow cylindrical cover 9 and the flange 10 is welded to the rear plate 3. Thus the cylindrical cover 9 is rigidly fixed to the rear plate 3. In the same manner as shown in FIG. 5, the insertion of the pin 6 can prevent the release of the detecting element 5 from the cylindrical cover 9.

In the first embodiment shown in FIG. 4, the shoulder of the cylindrical cover 4 is formed between the reduced diameter portion 4b and the increased diameter portion 4a. However in the second embodiment shown in FIG. 6, the end of the cylindrical cover 9 is extended outwardly so as to form the flange 10. Therefore, instead of the shoulder which is formed from a part of the cylindrical cover 4 as shown in FIG. 4, a shoulder or inside corner is formed at the point where the surface of the rear plate 3 first contacts the flange 10 above the hole 3' (FIG. 4). Consequently, in FIG. 6, a diaphragm spring is mounted between the shoulder of the detecting element 5 and the above-mentioned shoulder or inside corner formed by the rear plate 3 and flange 10.

Referring to FIG. 7, which shows the third embodiment of the present invention, a hollow cylindrical cover 11 comprises an increased diameter portion 11a and a reduced diameter portion 11b. The reduced diameter portion 11b is press-fitted into a hole 3' formed on the rear plate 3 and is rigidly fixed to the rear plate 3. A snap ring 12 is fitted into a groove which is formed along the inner wall of the cylindrical cover 11 and the end of a detecting element 13 abuts against the side of the snap ring 12. The snap ring 12 prevents the movement of the detecting element 13 out of the cylindrical cover 11. The arrangement of a diaphragm spring 14 prevents looseness of the detecting element 13 in the cylindrical cover 11.

Referring to FIGS. 8 through 12, which show the fourth embodiment of the present invention, in the same manner as shown in FIG. 2, the end of the reduced diameter portion of a hollow cylindrical cover 15 is bent outwardly and flattened so as to be secured on the edge of the hole 3' and, thus, the cylindrical cover 15 is rigidly fixed to the rear plate 3. A pair of L-shaped openings 15b are formed on the increased diameter portion 15a of the cylindrical cover 15, although only a single opening is illustrated in FIGS. 8 and 10. Each of the L-shaped openings 15b has an open end at the end of the increased diameter portion 15a. As shown in FIG. 9, outwardly extending projections 16b and 16c are formed on the center of the cylindrical surface of the increased diameter portion 16a of the detecting element 16 and a recess 16d is formed on the end of the cylindrical surface of increased diameter portion 16a. As shown in FIG. 8, a tongue 15c is formed on the end of the increased diameter portion 15a of the cylindrical cover 15.

Figure 11:
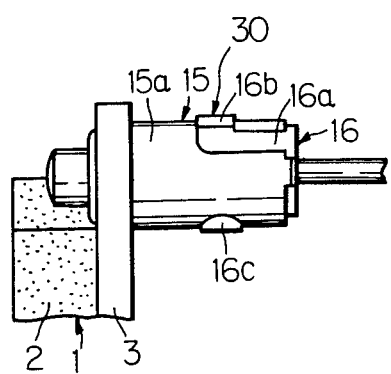
FIG. 11 is a bottom plane view of the assembly in FIG. 10.
Figure 12:
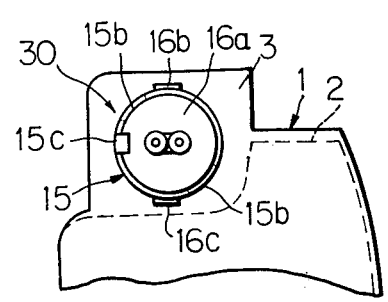
FIG. 12 is a rear view of the assembly in FIG. 11 looking from the right in FIG. 11.

FIGS. 10 through 12 show the detecting device 30, including the assembled detecting element 16. The detecting element 16 is assembled with the cylindrical cover 15 in a such manner that after the projections 16b and 16c of the detecting element 16 are aligned with the open ends of the openings 15b, the detecting element 16 is inserted into the cylindrical cover 15 and, then, the detecting element 16 is rotated so that the projections 16b and 16c are positioned at the close ends of the openings 15b. Then, the tongue 15c of the cylindrical cover 15 is bent inwardly so as to be engaged into the recess 16d, thereby preventing the relative rotation of the detecting element 16 with respect to the cylindrical cover 15. In the same manner as shown in FIG. 4, a diaphragm spring is arranged between a shoulder of the detecting element 16 and a shoulder of the cylindrical cover 15 (not shown). Thus, the arrangement of the diaphragm spring can prevent looseness of the detecting element 16 in the cylindrical cover 15.

Figure 13:
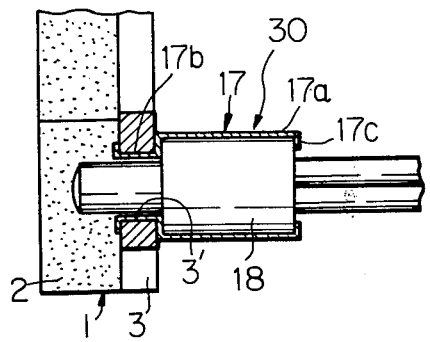
FIG. 13 is a side view, partly in cross section, of the fifth embodiment of the invention.
Figure 14:
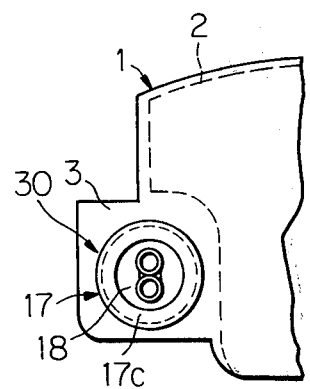
FIG. 14 is a rear view of the assembly in FIG. 13 looking from the right in FIG. 13.

Referring to FIGS. 13 and 14, which show the fifth embodiment of the present invention, in the same manner as shown in FIG. 2, the end of the reduced diameter portion 17b of a hollow cylindrical cover 17 is bent outwardly and flattened so as to be secured on the edge of the hole 3' and thus, the cylindrical cover 17 is rigidly fixed to the rear plate 3. A detecting element 18 is inserted into the rear plate 3. A detecting element 18 is inserted into the cylindrical cover 17 and then the open end of the increased diameter portion 17a of the cylindrical cover 17 is bent inwardly so as to prevent the movement of the detecting element 18 out of the cylindrical cover 17.

In a conventional detecting device comprised of only a detecting element having a shoulder, when pebbles and other objects are thrown up by the wheel of the vehicle and strike the detecting element, a concentration of stress occurs at the shoulder of the detecting element, causing the destruction of the detecting element. According to the present invention, such disadvantage is eliminated by covering the detecting element with a cylindrical cover of simple construction.

What is claimed is:

1. A device for warning of excessive brake lining wear in a disc brake for a vehicle, the device including:
   a rear support plate of a disc brake for a wheel of a roadway vehicle, said plate having a brake lining attached to one side and a mounting hole extending through the plate, the other side of the plate being adapted to be exposed to the roadway during operation of a vehicle on which the disk brake is mounted;
   a detecting element having a waterproof, electrically insulating body made of a fragile material, the body of the detecting element having
      a first part extending through said mounting hole and projecting for a predetermined distance beyond the one side of the rear plate,
      a second part projecting from the other side of the rear plate, and
      means adapted to connect the detecting element to a warning circuit for warning the operator of a vehicle on which the disc brake is mounted when the brake lining becomes worn to a thickness less than said predetermined distance; wherein the improvement comprises:
   the first part of the body of the detecting element being a cylinder having a first diameter; the second part of the body being a cylinder having a second diameter larger than the first diameter and a shoulder joining the first and second cylinders;
   a metallic means attached to the rear plate and surrounding the second part of the fragile body for protecting said body from breakage by foreign objects when the vehicle is in operation;
   said metallic means comprising a first hollow cylindrical portion covering and slidably holding the second part of the body of the detecting element and
      a second hollow cylindrical portion having an outside diameter smaller than the outside diameter of the first hollow portion that slidably fits within the mounting hole through the rear plate, an inside diameter that slidably holds the cylindrical first part of the body of the detecting element, and a length equal to the thickness of the rear plate;
      a shoulder joining one end of the second hollow cylindrical portion to the first hollow cylindrical portion, said shoulder bearing against the other side of the rear plate; and
      an outwardly extending flange on the other end of the second hollow cylindrical portion, said flange bearing against the one side of the rear plate, whereby the second portion of the metallic means is attached to the rear plate by said shoulder and said flange, and said device further comprises
   means for securing the detecting element in the metallic means and biasing means acting between the hollow cylindrical portion of the metallic means and the second part of the detecting element to prevent looseness of said detecting element in said metallic means.

2. A device according to claim 1 wherein said biasing means comprises a diaphragm spring positioned between the shoulder joining the first and second cylindrical parts of the body of the detecting element and the shoulder joining the first and second cylindrical portions of the metallic means for urging the detecting element against said securing means.

3. A device for warning of excessive brake lining wear in a disc brake for a vehicle, the device including:
   a rear support plate of a disc brake for a wheel of a roadway vehicle, said plate having a brake lining attached to one side and a mounting hole extending through the plate, the other side of the plate being adapted to be exposed to the roadway during operation of a vehicle on which the disc brake is mounted;
   a detecting element having a water proof, electrically insulating body made of a fragile material, the body of the detecting element having
      a first part extending through said mounting hole and projecting for a predetermined distance beyond the one side of the rear plate,
      a second part projecting from the other side of the rear plate, and
      means adapted to connect the detecting element to a warning circuit for warning the operator of a vehicle on which the disc brake is mounted when the brake lining becomes worn to a thickness less than said predetermined distance; wherein the improvement comprises:
   the first part of the body of the detecting element being a cylinder having a first diameter; the second part of the body being a cylinder having a second diameter larger than the first diameter and a shoulder joining the first and second cylinders;
   a metallic means attached to the rear plate and surrounding the second part of the fragile body for protecting said body from breakage by foreign objects when the vehicle is in operation;
   said metallic means comprising a first hollow cylindrical portion covering and slidably holding the second part of the body of the detecting element and a second portion attaching the hollow cylindrical portion to the rear plate; and said device further comprises means for securing the detecting element in the metallic means and biasing means acting between the hollow cylindrical portion of the metallic means and the second part of the detecting element to prevent looseness of said detecting element in said metallic means, and wherein
   the cylindrical second part of the body of the detecting element comprises two diametrically opposed, circumferentially extending grooves spaced axially from the shoulder of said body and a projection extending radially from the end of the second part; said first hollow cylindrical portion of the metallic means comprises a slot in the outer end thereof, said slot matingly engaging said projection for preventing rotation of the body of the detecting element in the metallic means, and two pairs of openings, each pair spaced from the shoulder joining the first and second hollow cylindrical portions for alignment with a corresponding one of the two grooves in the body of the detecting element; and said securing means comprises a pin inserted through each pair of said openings in engagement with said grooves, thereby preventing the release of the body of said detecting element from the second hollow cylindrical portion of said metallic means.

* * * * *